J. N. LOWRANCE.
Improvement in Animal-Traps.
No. 129,415.
Patented July 16, 1872.
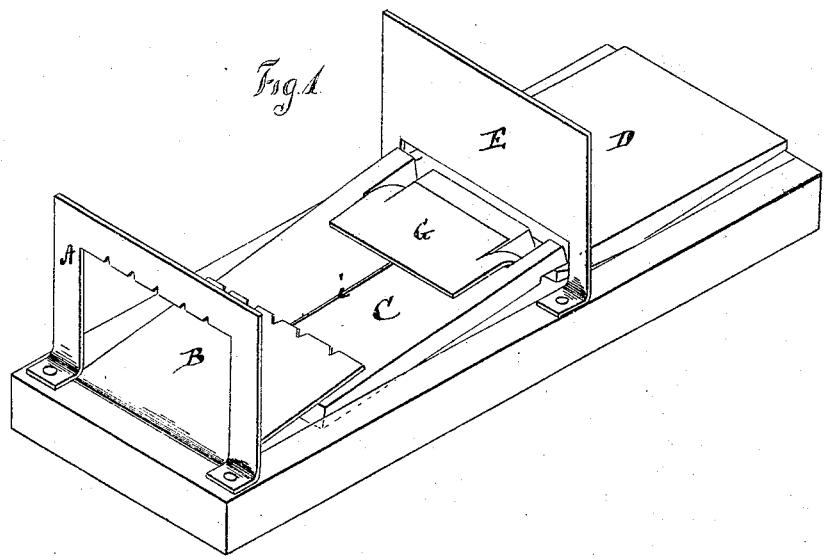
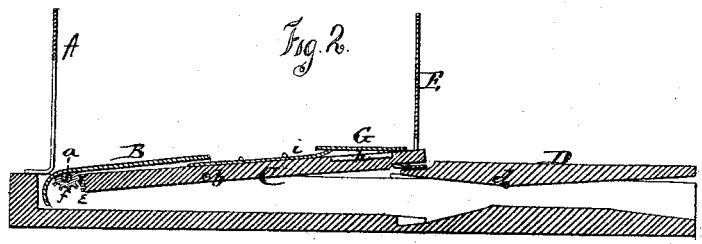
Witnesses:
Inventor
John N. Lowrance
per Alexander Mason
Attorneys.

UNITED STATES PATENT OFFICE.

JOHN N. LOWRANCE, OF MONTEZUMA, ILLINOIS.

IMPROVEMENT IN ANIMAL-TRAPS.

Specification forming part of Letters Patent No. 129,415, dated July 16, 1872; antedated July 13, 1872.

*To all whom it may concern:*

Be it known that I, JOHN N. LOWRANCE, of Montezuma, in the county of Pike and in the State of Illinois, have invented certain new and useful Improvements in Animal-Trap; and do hereby declare that the following is a full, clear, and exact description thereof, reference being had to the accompanying drawing and to the letters of reference marked thereon making a part of this specification.

The nature of my invention consists in the construction and arrangement of an "animal-trap," as will be hereinafter more fully set forth.

In order to enable others skilled in the art to which my invention appertains to make and use the same, I will now proceed to describe its construction and operation, referring to the annexed drawing, in which—

Figure 1 is a perspective view, and Fig. 2 a longitudinal vertical section of the interior mechanism of my trap, the box in which the same is to be inclosed being removed.

A represents the end of the trap with opening, through which the animal enters; said opening being closed by a door, B, which is hinged or pivoted at its lower end on a rod, $a$. The floor of my trap is divided in two parts, C and D, hinged or pivoted at $b$ and $d$, respectively, the inner end of the part C resting upon the outer end of the part D, and the inner end of said part D being the heaviest it raises the inner end of the part C, closing the opening in a partition, E, which divides the box into two compartments. From the front end of the part C projects an arm provided with a short rack-bar, $e$, which gears with a cogged segment, $f$, on the rod $a$, so that the motion of said part C will operate the door B, and open or close the same, as the case may be. When this door is open it rests upon the part C of the floor, as shown. In the inner end of the part C is a recess, $h$, for the bait; said recess or box being closed by a plate, G, which is held by a spring, $i$, sufficiently high up from the bait to allow it to be smelled by the animal, but not touched or got at by it.

The animal enters through the opening in the end A, and, passing up the part C of the floor, reaches the bait-box, when the weight of the animal lowers the inner end of said part, closing the door B by means of the rack-bar $e$ and segment $f$, at the same time, of course, raising the inner end of the part D. This opens the opening in the partition E and the animal, passing through the same onto the part D of the floor, tips the same, which resets the trap again and dumps the animal into another box below.

Having thus fully described my invention, what I claim as new, and desire to secure by Letters Patent, is—

1. The combination of the door B, parts C D of the floor partition E, rack-bar $e$, and cogged segment $f$, all constructed and arranged to operate substantially as and for the purposes herein set forth.

2. The combination of the bait-recess $h$, plate G, and spring $i$, constructed and arranged, as described, upon the part C of the floor, substantially as and for the purposes herein set forth.

In testimony that I claim the foregoing I have hereunto set my hand this 13th day of December, 1871.

J. N. LOWRANCE.

Witnesses;
JOHN H. STEVENSON,
JAMES O. FOREMAN.